United States Patent
Artru et al.

(10) Patent No.: US 7,606,221 B2
(45) Date of Patent: Oct. 20, 2009

(54) NETWORK COMMUNICATIONS HAVING ENDPOINT DEVICE WITH AUTOMATIC CONNECTION TO IPBX

(75) Inventors: Fredric Artru, Montreal (CA); Andy Huckridge, Sunnyvale, CA (US); Marc Petit-Hugenin, Vence (FR); Jean-Hugues Robert, La Gaude (FR); Michael Roper, Cupertino, CA (US); Philip Bednarz, Menlo Park, CA (US)

(73) Assignee: 8×8, Inc., Sunnyvale, CA (US)

( * ) Notice: Subject to any disclaimer, the term of this patent is extended or adjusted under 35 U.S.C. 154(b) by 786 days.

(21) Appl. No.: 10/996,657

(22) Filed: Nov. 24, 2004

(65) Prior Publication Data

US 2005/0111440 A1 May 26, 2005

Related U.S. Application Data

(63) Continuation of application No. 09/658,796, filed on Sep. 11, 2000, now abandoned.

(60) Provisional application No. 60/154,093, filed on Sep. 15, 1999, provisional application No. 60/212,220, filed on Jun. 16, 2000, provisional application No. 60/212,221, filed on Jun. 16, 2000, provisional application No. 60/211,993, filed on Jun. 16, 2000, provisional application No. 60/212,215, filed on Jun. 16, 2000, provisional application No. 60/211,992, filed on Jun. 16, 2000, provisional application No. 60/212,219, filed on Jun. 16, 2000.

(51) Int. Cl.
*H04L 12/66* (2006.01)

(52) U.S. Cl. .................... 370/352; 370/401; 370/467; 379/88.17; 379/219

(58) Field of Classification Search ......... 370/352–356, 370/401, 467; 379/88.17, 219
See application file for complete search history.

(56) References Cited

U.S. PATENT DOCUMENTS

| | | | |
|---|---|---|---|
| 5,182,750 A * | 1/1993 | Bales et al. | 370/384 |
| 5,796,727 A | 8/1998 | Harrison et al. | |
| 6,075,783 A | 6/2000 | Voit | |
| 6,104,711 A | 8/2000 | Voit | |
| 6,125,277 A | 9/2000 | Tanaka | |
| 6,185,204 B1 | 2/2001 | Voit | |
| 6,192,438 B1 | 2/2001 | An | |
| 6,215,790 B1 | 4/2001 | Voit et al. | |
| 6,236,642 B1 | 5/2001 | Shaffer et al. | |
| 6,330,244 B1 * | 12/2001 | Swartz et al. | 370/401 |
| 6,359,880 B1 * | 3/2002 | Curry et al. | 370/352 |

(Continued)

*Primary Examiner*—William Trost, IV
*Assistant Examiner*—Roberta A Shand
(74) *Attorney, Agent, or Firm*—Crawford Maunu PLLC

(57) ABSTRACT

A telephony communications approach implements an auto-discover feature that enables an endpoint device to automatically locate and establish communication with a desirable server in a web of interconnected servers. In one specific example implementation, the endpoint device is an internet-type telephone communicating with a remotely-located server in an internet-based private branch exchange. Various packet-communicating endpoint devices are adapted to communicate with the internet-based private branch exchange by adapting each to automatically broadcast its identity and, in response to receiving an assignment for the appropriated iPBX, establish communication with the internet-based private branch exchange from other packet-based servers. Other aspects of the invention are directed to approaches for distinguishing the desired internet-based private branch exchange from the other packet-based servers and implementations for assigning the appropriate iPBX.

20 Claims, 4 Drawing Sheets

U.S. PATENT DOCUMENTS 6,389,005 B1    5/2002   Cruickshank
6,496,700 B1 *  12/2002  Chawla et al. ........... 455/435.2
6,542,497 B1    4/2003   Curry et al.
6,600,734 B1 *  7/2003   Gernert et al. .............. 370/352

* cited by examiner

NETWORK COMMUNICATIONS HAVING ENDPOINT DEVICE WITH AUTOMATIC CONNECTION TO IPBX

RELATED PATENT DOCUMENTS

This is a continuation of U.S. patent application Ser. No. 09/658,796, filed on Sep. 11, 2000 now abandonded, to which Applicant claims priority under 35 U.S.C. § 120, and which is incorporated herein by reference, and which claims benefit of U.S. Patent Application Ser. No. 60/154,093 and entitled "Voice-Over IP Audio Terminal Processor," filed Sep. 15, 1999, and fully incorporated by reference; this patent document also claims benefit under 35 U.S.C. § 119 to the following U.S. Provisional Patent Applications: U.S. Patent Application Ser. No. 60/212,220, entitled "Communications System Architecture," U.S. Patent Application Ser. No. 60/212,221, entitled "IP Phone Circuit Arrangement and Method," U.S. patent application Ser. No. 09/597,705, entitled "Communications Controller and Method Therefor," U.S. Patent Application Ser. No. 60/211,993, entitled "High Availability IP Telephony," U.S. Patent Application Ser. No. 60/212,215, entitled "System Interface Implementation for Hosted iPBX," U.S. Patent Application Ser. No. 60/211,992, entitled "IP Telephony Station Equipment," and U.S. Patent Application Ser. No. 60/212,219, entitled "iPBX Hosting," each of which was filed with the U.S. Patent and Trademark Office on Jun. 16, 2000 and is herein fully incorporated by reference.

FIELD OF THE INVENTION

The present invention relates to communication systems, and more particularly, to an internet-type telephony endpoint device and communications methodology therefor.

BACKGROUND OF THE INVENTION

The electronics industry continues to rely upon advances in technology to realize higher-functioning devices at cost-effective prices. For many communication applications, realizing higher-functioning devices in a cost-effective manner requires the creative use of communications channels. Many technologies have been developed that have enhanced communications. Examples include the Internet, facsimile applications, public switched telephone networks (PSTN), wireless telephones, voicemail systems, email systems, paging systems, conferencing systems, electronic calendars and appointment books, electronic address books, and video-image processing systems that communicate video data simultaneously with voice data over a telephones and the Internet. As the popularity of these technologies increases, so does the need to merge and coordinate these technologies in a manner that is convenient and cost-effective for the user.

The above-mentioned technologies have been developed in a relatively isolated manner. Large-scale integration of multiple communications systems has been costly and difficult to achieve and manage. One difficulty stems from the variety of communications channels and data types used for various applications. For example, telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital network (ISDN), and digital subscriber line (DSL) systems, to name a few. Many telephone systems, particularly for business applications, offer services including voicemail, facsimile, call forwarding, and other call-controls, but these systems are often costly, difficult to manage, limited in scope, and do not offer integration of various communications methods. In addition to difficulties inherent in coordinating telephony-type communications, the coordination of additional communications, such as text, video, or other data, provides additional challenges.

Widespread acceptance and usage of communication systems and services are largely a function of cost and user convenience. Therefore, widespread acceptance and usage of such technology cannot be forced, even when appropriately addressing the marketing needs and overcoming the exorbitant costs of the mass production equipment.

The scalability of a communications system weighs heavily upon the acceptance of the system. As the face of today's workplace is changing, the ability to provide flexible communications services is becoming increasingly important. Many employees are highly mobile, moving between companies and between jobs within a company. When employees are added, leave or move within the company, the communications systems for those employees must be modified. In addition, many employees work from several locations, such as a base office, home, or a branch office. To accommodate ongoing communications needs, a user-friendly and user-reconfigurable system would be advantageous.

SUMMARY OF THE INVENTION

The present invention is directed to a telephony communications arrangement and device implementing an autodiscover feature that enables an endpoint device to automatically establish connection with a desirable server in a web of interconnected servers. In addition, the ease of use and cost-effectiveness of the present invention enable the use of such communications control and coordination of many applications, including small and medium-sized business applications. The present invention is exemplified in a number of implementations and applications, some of which are summarized below.

According to an example embodiment of the present invention, a telephony communications arrangement includes an internet-based private branch exchange with a programmable processor circuit programmed to control a server at the internet-based private branch exchange. The server is adapted to communicate to a remote location over a first communications path using a plurality of packet-based communications and endpoint devices. The packet-based communicating endpoint devices are adapted to communicate with the internet-based private branch exchange over a second communications path which is directly coupled communicatively to the first communications path. The second communications path is also communicatively coupled to the plurality of other packet-based servers. Each packet-communicating endpoint device is configured and arranged to automatically broadcast its identity and establish communication with the internet-based private branch exchange from the plurality of other packet-based servers for establishing packet-based communications between the packet-communicating endpoint device and the internet-based private branch exchange.

According to other aspects of the present invention, one or more of the packet-communicating endpoint devices are adapted to seek one of the internet-based private branch exchanges for establishing a communication link. This seeking mode is implemented in different manners, according to different implementations of the present invention. For example, one implementation involves the endpoint device being adapted to broadcast its identity in anticipation of a DNS (Directive Name Server) being previously configured to monitor for such broadcasts. In response to detecting this broadcast, the DNS responds with an assignment of the iPBX for the broadcasting endpoint device. The broadcasting endpoint device then commences communication with the assigned iPBX.

In another example implementation, the endpoint device broadcasts its identity and a unique iPBX is configured to monitor for such broadcasts. In response to detecting this broadcast, the iPBX responds by informing the broadcasting endpoint device that all subsequent communication should be directed to this unique iPBX.

Respective variations of the above two specific example implementations include further programming the endpoint device with a security code that is used by the monitoring device to reduce the likelihood that the endpoint device would be improperly assigned by either the broadcast-monitoring DNS or the broadcast-monitoring iPBX.

In another example implementation, the packet-communicating endpoint devices are implemented using a forced "address-search" for identifying the internet-based private branch exchange relative to the plurality of other packet-based servers. In this environment, each of the packet-communicating endpoint devices is pre-programmed with the identification of the DNS for the purpose of submitting to the DNS a request for the appropriate iPBX assignment.

According to another example embodiment of the present invention, each of the packet-communicating endpoint devices is further adapted to store a unique Media Access Call address and is able to communicate the unique Media Access Call address with the internet-based private branch exchange. Further, each of the packet-communicating endpoint devices may be adapted to store a unique code that identifies the internet-based private branch exchange relative to the plurality of other packet-based servers.

In another example embodiment, each of the packet-communicating endpoint devices is further adapted to execute a program that causes the packet-communicating endpoint device to establish communication based on a set of search rules. For example, the endpoint device for one of the servers that manifests an acceptable routing path to establish packet-based communication. This embodiment may be further modified to define the acceptable routing path in terms of an optimally minimum number of routing connections identified over a predetermined time period during a broadcast effort for establishing connection with the desired iPBX.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
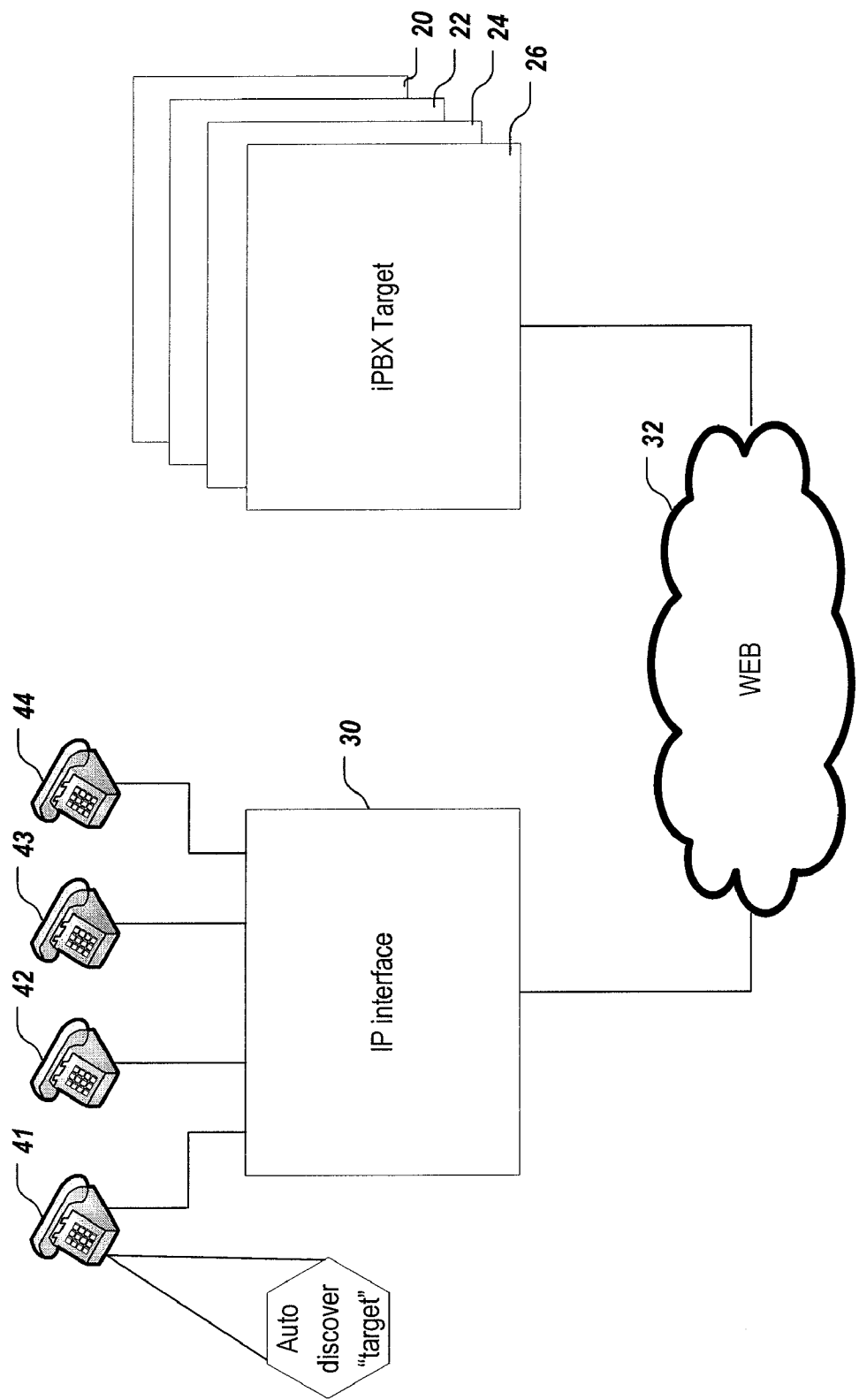
FIG. 1 is an illustration of a packet-based communications system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communications systems, and has been found particularly suited to such systems requiring or benefiting from user-friendly control for processing various telephony communications data types and routing the communications via an Internet protocol (IP) type of network. For example, the present invention has been found to be advantageous when operating in conjunction with an iPBX server of the type characterized in the above-referenced patent documents. While the present invention is not necessarily limited to such systems, various aspects of the invention may be appreciated through a discussion of various examples using this context.

According to an example embodiment of the present invention, a communications service provider network is adapted to receive, process and deliver communications data of various types using a cost-effective, user-friendly operations platform. The network includes a plurality of communication stations communicatively coupled to one or more communications links. One of the communication stations is adapted to communicate packet-based data to a computer server arrangement communicatively coupled to the communications links. The telephony-controlling computer server can be configured in any of a number of ways including, for example, being adapted to operate with a IP telephony switch by passing and/or redirecting data-carrying messages for uniquely-targeted endpoint devices (e.g., an IP telephone, a display or household appliance). The server and/or IP telephony switch is communicatively coupled to the communications stations (and in certain applications other endpoint devices) through a communications links which couples to a multitude of other server-type communication terminals. One (or multiple ones) of the communication stations is programmed to automatically discover a selected one of many possible servers for establishing a link therewith. This automatic discovery is achieved, for example, by designing (e.g, programming) the endpoint device to respond to activation by automatically broadcasting its identity and programming a DNS or a targeted iPBX to monitor the network for such a broadcast and then assign the broadcasting endpoint device with the identity and any desired related codes for establishing communication between the endpoint device and the targeted iPBX. Such an assignment from the DNS can be direct or through another server such as the targeted iPBX.

Also according to the present invention, the above-described autodiscover mode is implemented to permit ease of operation for the user of the IP phone. In a particular example embodiment, for example, the autodiscover protocol is implemented by configuring the server-seeking endpoint device with a unique code that identifies the internet-based private branch exchange relative to the plurality of other packet-based servers. In another example embodiment, the autodiscover mode is implemented by forcing a search for a server having one or more selected characteristics based on a set of rules with which the server-seeking endpoint device is programmed to abide by. In another example embodiment, this mode is achieved using a combination of selectable modes, including for example using one of the above approaches as a default mode and each other mode being selectable by the IP phone user or another personnel responsible for the programming and/or maintaining operation of the IP phone.

FIG. 1 is a specific example communications network operating consistent with the above discussion and according to the present invention, and is useful in obtaining a better appreciation of the present invention. In this system, a telephony communications arrangement includes a number of service providers 20, 22, 24 and 26, with the service provider 26 being adapted as a target internet-based private branch exchange providing communications operations with a target set of endpoint devices and another of the service provides being a DNS for the local Web network. The service provider 26 includes a programmable processor circuit (not shown in FIG. 1) programmed to control the server and internet-based private branch exchange operations; these operations include communicating to remote locations over a first communications path, such as a conventional telephony path (e.g., ISDN, cable, wireless, POTS), linking the service provider 26 as one of a plurality of possible communication targets for IP interface 30. The WEB, depicted as 32 of FIG. 1, is an example of such a first communications path; other examples include those paths that provide more private or secure communications, such as intranet LAN-type applications and government-defined communication networks.

The IP interface 30 is depicted in this example illustration as providing a communications path to the WEB 32 for various endpoint devices such as internet-protocol (IP) phones 41-44, which are interconnected using a second communications path, such as a LAN or other type, provided within one or more facilities hosting the IP phones 41-44. Any of the internet-protocol phones 41-44 can be implemented with an auto-discover mode for seeking a particular type of server, such as a target iPBX-based server 26. In this context, the target set of endpoint devices for the target iPBX-based server 26 includes at least IP phone 41. In one example specific application embodiment, the interface 30 of FIG. 1 is a circuit implementation available from 8×8, Inc., such as characterized in connection with the first (and other of the) above-referenced patent documents.

In this auto-discover mode, the IP phone automatically searches for and distinguishes the internet-based private branch exchange 26 from the plurality of other packet-based servers 20, 22 and 24 and, in response, establishes packet-based communications with the targeted server.

Implementing the internet-protocol phone 41 with an auto-discover mode is useful in many regards. For example, should a facility location be assigned with an IP phone 41 for the first time, a communications manager (e.g., MIS personnel or an employee responsible for programming/maintaining the IP phone 41) can configure the IP phone 41 so that each time the IP phone attempts to communicate outside the facility or facilities, it searches for a particular server that is configured to remotely manage various aspects of the IP phone 41, for example, as described in connection with the above-referenced patent documents. In this manner, the user of the IP phone 41 does not have to possess any previous knowledge of the target server's IP address or under which circumstances the user should be connecting to one server versus another server.

In another embodiment, the interface 30 of FIG. 1 is programmed and configured to perform the search tasks, including broadcasting functions for example, for implementing this autodiscover mode on behalf of the IP phone 41.

Figure 2:
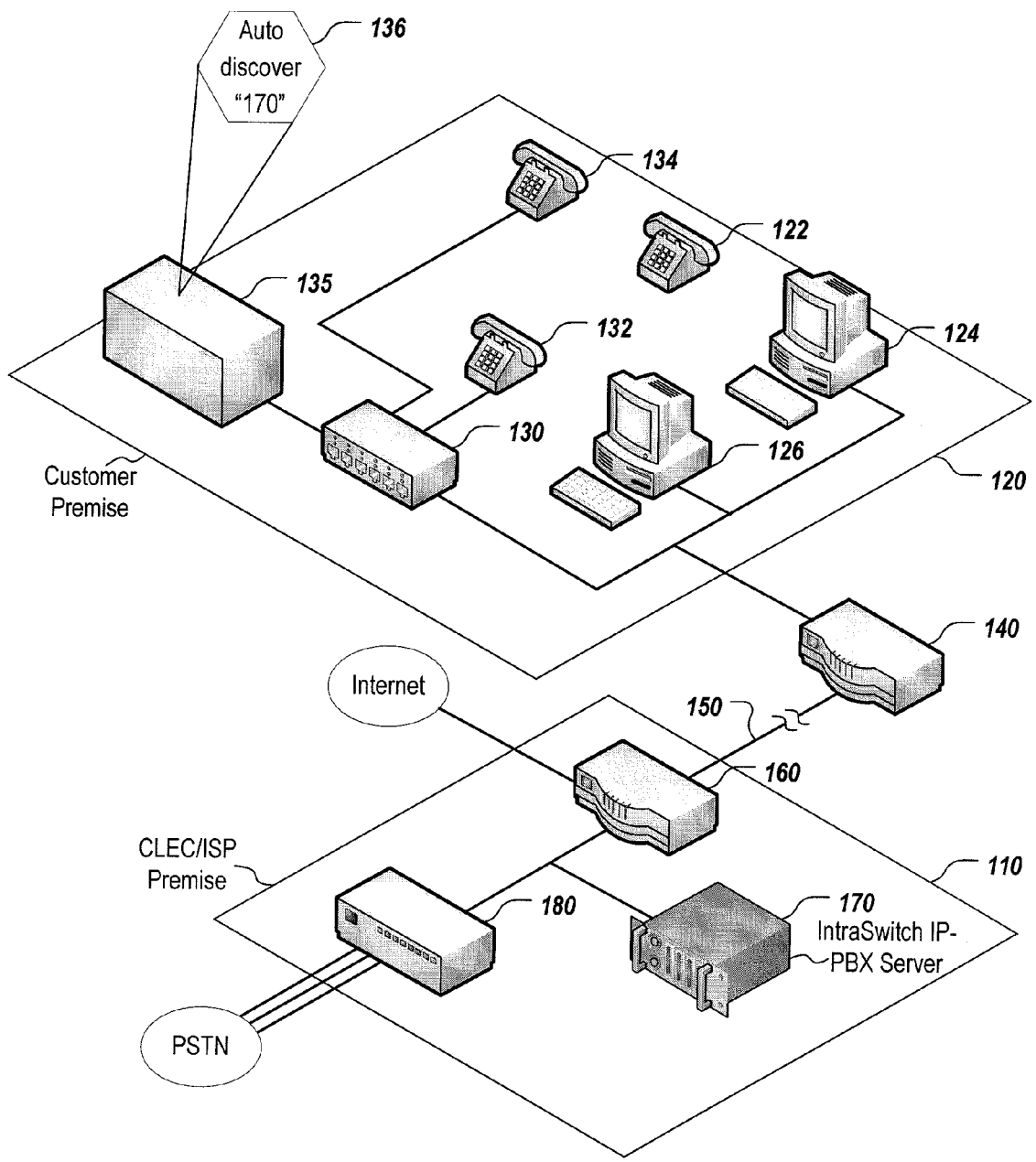
FIG. 2 is another illustration of a communications system, according to another example embodiment of the present invention.

FIG. 2 is another specific example communications network, also according to the present invention, which illustrates another application and other aspects of the present invention. In this communications environment, a service provider 110 is adapted to control and route communications data for a user premise 120. User premise 120 includes a variety of communications devices including an IP phone 122, computers 124 and 126, and two telephones 132 and 134 coupled to an IP gateway 130. Also shown is an IP appliance 135 adapted with a configuration 136 to seek a particular type of service provider, such as the service provider 110 shown in FIG. 2. Each of the devices is communicatively coupled to the service provider via a router 140 and a communications link 150. The service provider is adapted to send and receive communications data via a router 160 coupled to the communications link 150. The router 160 is coupled to the Internet, to a server 170 and an IP/PSTN gateway 180. The router 160 is adapted to route communications to either the router 140, the Internet, the server or the gateway 180.

The server 170 is programmed to control the routing of communications data to and from the user premise 120. The programming is accomplished in various manners, depending upon the functions being programmed and the security access level of the programming source. First, individual users at the customer premise can program the server. Each user programs various communications selections, such as those described hereinabove. Inputs from the computers 124 and 126, from the IP phone 122, or from the telephones 132 and 134 are all used for controlling the server. The computers have a user interface adapted to provide various communications selections to the server. The user interface may include, for example, the graphical user interface described in U.S. patent application Ser. No. 09/597,704, filed on Jun. 16, 2000, and entitled "Communications Controller and Method Therefor." Selections are made at the computer interface for controlling communications between the computer and one or more other communications devices. Similarly, the IP phone 122 and other telephones 132 and 134 are used to input control information, such as via a touch-tone sequence or other control code entry.

In addition to programming the server at the user premise 120, the server may also be programmed at remote locations, such as at a communications device communicatively coupled to the Internet or to the PSTN. As discussed in connection with communications devices located remote from the user premise, various control inputs are provided to the server via the respective connections using remote communications devices. For example, Internet communications devices such as a computer, a wireless telephone having Internet communications ability or an Internet interface such as a WebTV interface could all be adapted for use in communicating with the server to provide programming information.

For further details regarding manners of implementing the system of FIG. 2, reference may be made to U.S. Patent Application Ser. No. 60/212,159, filed on Jun. 16, 2000, and entitled "Communications Service Provider Network."

Figure 3:
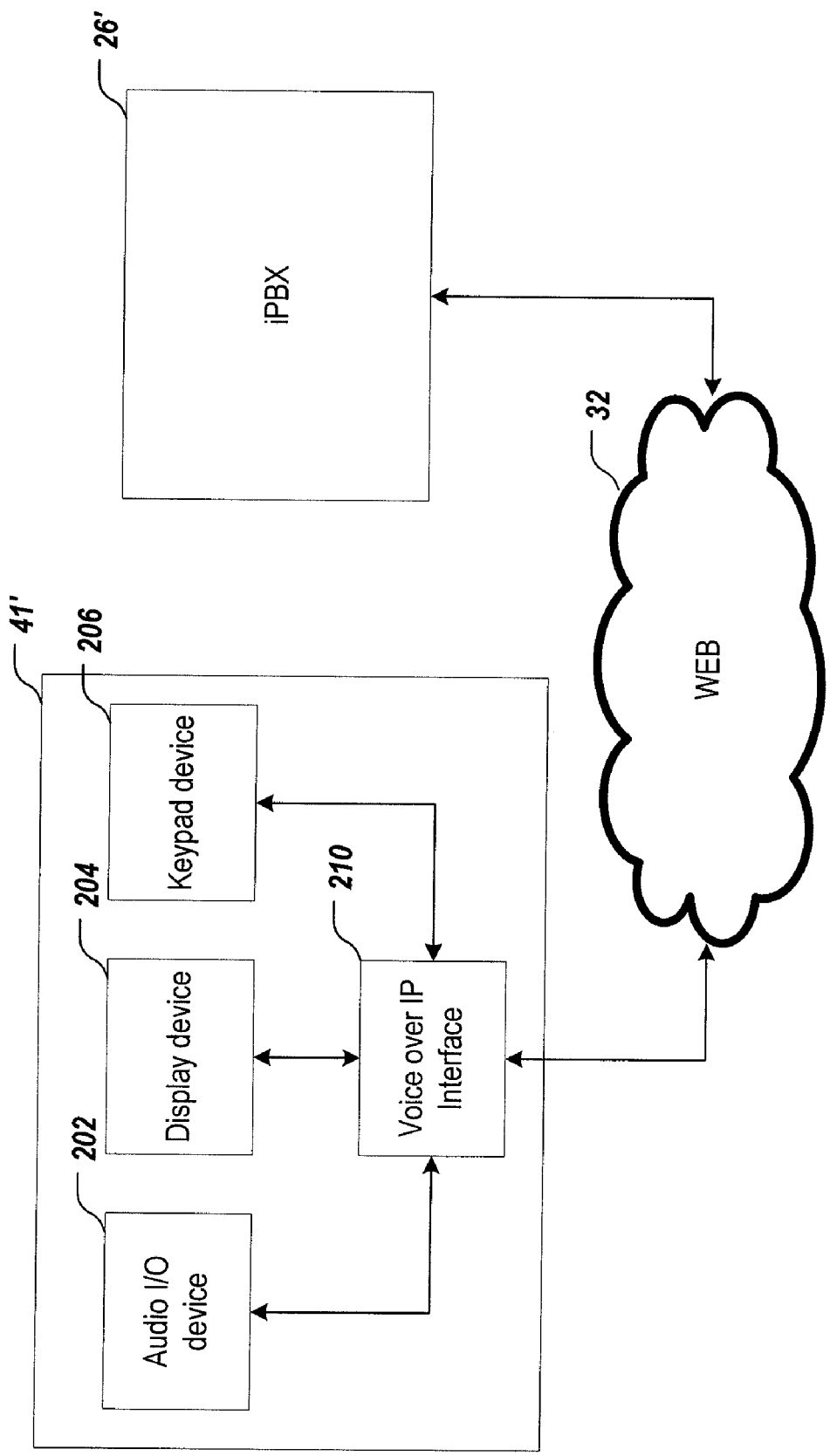
FIG. 3 is an illustration of an endpoint communications device, according to another example embodiment of the present invention, communicating with an internet-type private branch exchange.
Figure 4:
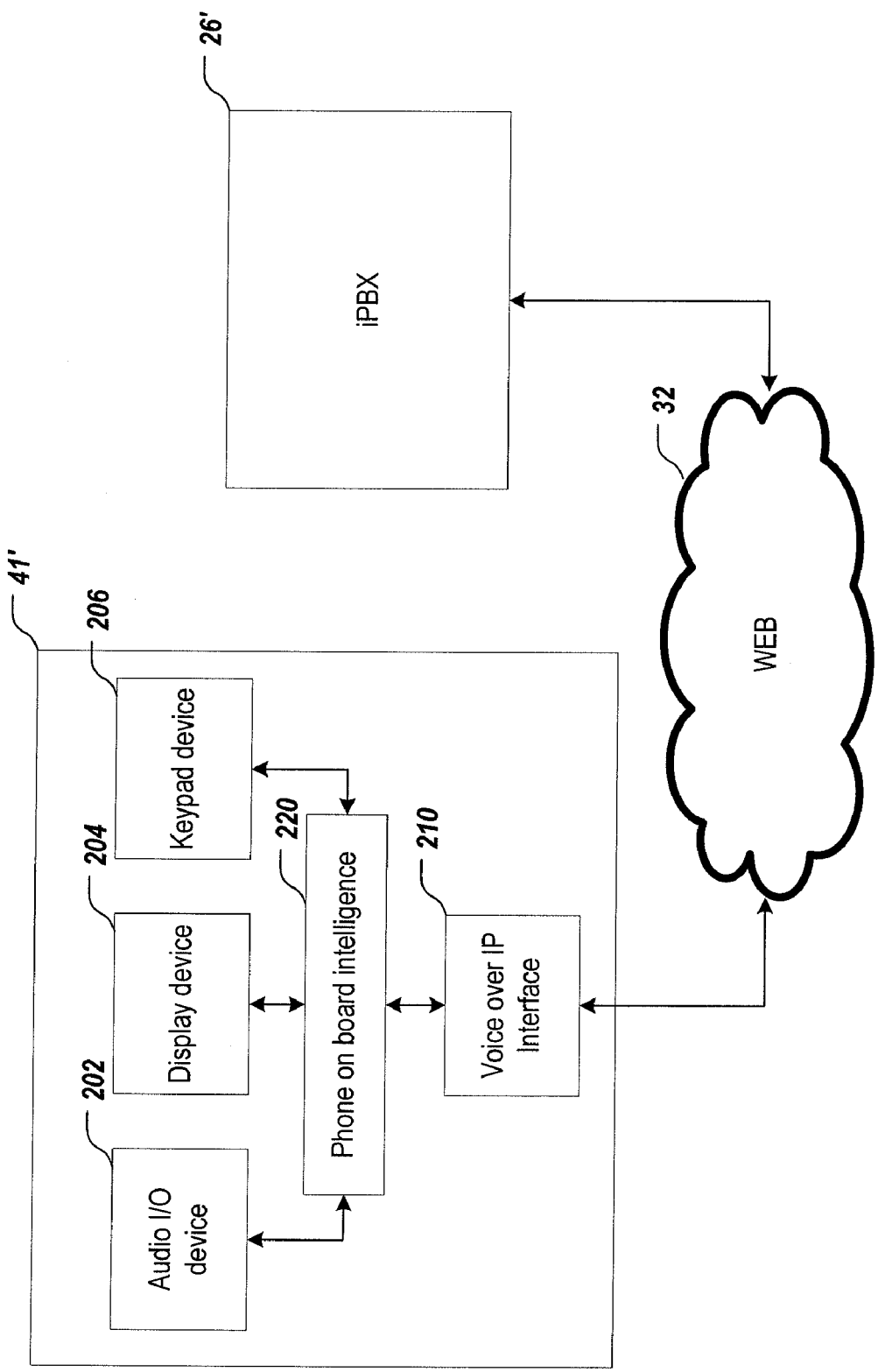
FIG. 4 is an illustration of another endpoint communications device, according to another example embodiment of the present invention, communicating with an internet-type private branch exchange.

FIGS. 3 and 4 respectively show first and second example implementations for the endpoint device 41 of FIG. 1, or for endpoint appliance 135 of FIG. 2. With reference to each of these devices 41 and 135, each of FIGS. 3 and 4 includes the corresponding notation 41' and, for the related iPBX, 26'. It will be appreciated that certain of the elements illustrated in FIGS. 3 and 4 are not required for all possible endpoint or appliance types. For example, an endpoint device that does not receive and process user audio does not require an audio input port and related audio-input processing circuitry.

The endpoint device 41' includes audio I/O ports (not shown) and related processing circuitry 202, implementations of which are discussed for example in connection with U.S. patent application Ser. No. 09/086,434, filed on May, 28, 1998, and Ser. No. 09/392,124, filed on Sep. 8, 1999 (U.S. Pat. No. 7,272,553), and Ser. No. 09/203,311, filed on Dec. 1, 1998. Various implementations for the user-output and user-input implementations 204 and 206 are well known and can be implemented using various technology including the conventional technology presently available on conventional telephones. The endpoint device 41' also includes a voice-over-IP interface circuit 210, which is used to present internet protocol data from the iPBX 26' to the display 204 and/or to the processing circuitry 202. In the implementation of FIG. 3, the voice-over-IP interface circuit 210 is also used to present user-input data from the user-input implementations 204 and 206 of the device 41' to the iPBX 26'.

A significant difference between the implementations of FIGS. 3 and 4 is that the implementation of FIG. 4 includes a circuit configured for special executive-decision processing; this block is denoted 220. The tasks executed by the circuit 220 depend upon the particular implementation and in certain applications these include analyzing and validating security in connection with iPBX assignments from over the Web. The skilled artisan will appreciate that, for the less-complex endpoint devices, the implementation of FIG. 3 is less expensive to design and manufacture.

Using the above or another configuration, the packet-communicating endpoint devices seek a targeted one of the internet-based private branch exchanges for establishing a communication link based on a previously-assigned unique server code assignment, for example, as currently assigned by the Internet naming authority. Using this unique server code, the iPBX-seeking mode is implemented in different manners. For example, one specific implementation involves the endpoint device being adapted to broadcast its identity (e.g., using its Internet-assigned MAC address) in anticipation of a DNS (Directive Name Server) being previously configured to monitor for such broadcasts. In response to detecting this broadcast, the DNS responds with an assignment of the iPBX for the broadcasting endpoint device. The broadcasting endpoint device then commences communication with the assigned iPBX.

In another specific implementation, the endpoint device broadcasts its identity and a unique iPBX is configured to monitor for such broadcasts. In response to detecting this broadcast, the iPBX responds by informing the broadcasting endpoint device that all subsequent communication should be directed to this unique iPBX.

For each of these implementations, either of the endpoint-device implementations shown in FIG. 3 or FIG. 4 can be used. For further details of these implementations, reference may be made to the attached entitled, Symphony MGCP DNS Call Agent Discovery (Appendix A), and to VoIP Terminal Discovery Protocol, (Appendix B); each being fully incorporated herein by reference.

In yet another specific example implementations, the packet-communicating endpoint devices seek a targeted one of the internet-based private branch exchanges for establishing a communication link based on the previously-assigned unique server code assignment being programmed into the respective endpoint devices, for example, as programmed by the facility MIS manager before installation in the network. At such a time (and also with the previous implementations), the facility MIS manager can also program a security or password code for validation to a responding serving node on the network that might attempt to reassign the server code or otherwise establish communication with the endpoint device. After the endpoint device broadcasts its identity, a monitoring DNS or the target iPBX can respond with specific instructions for communication. The broadcasting endpoint device then commences communication based on the assignment(s) being provided.

While the present invention has been described with reference to several particular example embodiments, those skilled in the art will recognize that many changes may be made to the present invention. For example, other embodiments of the present invention can include a combination of one or more aspects discussed herein or as discussed in the other patent documents incorporated herein. Further, other commercially available interfaces can be used in connection with illustrated figures including the corresponding interfaces available from California-based Cisco. Such modifications do not depart from the spirit and scope of the present invention; rather the implementations, and their equivalents, set forth in the following claims define the invention.

What is claimed is:

1. A telephony communications arrangement, comprising:
  a unique internet-based private branch exchange providing telephone services and including a programmable processor circuit programmed to control the telephone services at the internet-based private branch exchange, the unique internet-based private branch exchange adapted to communicate to a remote location using packet-based communications on a packet-based network; and
  a plurality of packet-communicating endpoint Voice over Internet Protocol (VoIP) devices, each of which is adapted to communicate with the unique internet-based private branch using the packet-based network, wherein the packet-based network is also communicatively coupled to a plurality of other packet-based servers, and each packet-communicating endpoint device is configured and arranged to auto-discover the unique internet-based private branch exchange using broadcast message that identifies the endpoint and, in response to the broadcast message, receive an identifier for the unique internet-based private branch, and establish communication with the unique internet-based private branch exchange, and to distinguish, using the locator, the unique internet-based private branch exchange from the plurality of other packet-based servers for establishing packet-based communications between the packet-communicating endpoint device and the unique internet-based private branch exchange.

2. The arrangement of claim 1, wherein each of the packet-communicating endpoint devices is further adapted to store a unique code that identifies the internet-based private branch exchange relative to the plurality of other packet-based servers and to distinguish the unique internet-based private branch exchange from the plurality of other packet-based servers using the unique code.

3. The arrangement of claim 1, wherein each of the packet-communicating endpoint devices is further adapted to execute a program that causes the packet-communicating endpoint device to search for one of the plurality of other packet-based servers that manifests an acceptable routing path to establish packet-based communication.

4. The arrangement of claim 3, wherein each of the packet-communicating endpoint devices is further adapted to execute a program that causes the packet-communicating endpoint device to search for one of the plurality of other packet-based servers that manifests an acceptable routing path that is defined in terms of a geographic location of the one of the plurality of other packet-based servers.

5. The arrangement of claim 4, wherein each of the packet-communicating endpoint devices is further adapted to execute a program that causes the packet-communicating endpoint device to search for one of the plurality of other packet-based servers that manifests an acceptable routing path that is defined in terms of a geographic location of the one of the plurality of other packet-based servers, the geographic location being defined as a function of an area-code based telephone regulation associated with the geographic locations of the packet-communicating endpoint device and a destination of a telephony communication initiated from the packet-communicating endpoint device.

6. The arrangement of claim 4, wherein each of the packet-communicating endpoint devices is further adapted to execute a program that causes the packet-communicating endpoint device to search for one of the plurality of other packet-based servers that manifests an acceptable routing path that is defined in terms of a geographic location of the one of the plurality of other packet-based servers, the geographic location being defined as a function of an area-code based telephone regulation associated with the geographic locations of the packet-communicating endpoint device and a destination of a telephony communication initiated from the packet-communicating endpoint device, and independent-from area codes assigned to the respective packet-communicating endpoint device and said destination.

7. The arrangement of claim 3, wherein each of the packet-communicating endpoint devices is further adapted to execute a program that causes the packet-communicating endpoint device to search for one of the plurality of other packet-based servers that manifests an acceptable routing path that is defined in terms of a geographic location of a destination of a telephony communication initiated from the packet-communicating endpoint device.

8. The arrangement of claim 1, wherein the unique internet-based private branch exchange is further adapted to facilitate packet-based telephony communications between one of the plurality of packet-communicating endpoint devices and a destination of a telephony communication initiated from the packet-communicating endpoint device as a function of an area-code based telephone regulation associated with the geographic location of at least one of said packet-communicating endpoint device and said destination of a telephony communication initiated from the packet-communicating endpoint device.

9. The arrangement of claim 8, wherein the unique internet-based private branch exchange is further adapted to facilitate packet-based telephony communications between one of the plurality of packet-communicating endpoint devices and a destination of a telephony communication initiated from the packet-communicating endpoint device independent from area codes assigned to at least one of the respective packet-communicating endpoint device and said destination.

10. The arrangement of claim 8, wherein the unique internet-based private branch exchange is further adapted to facilitate packet-based telephony communications between one of the plurality of packet-communicating endpoint devices and a destination of a telephony communication initiated from the packet-communicating endpoint device as a function of area codes assigned to at least one of the respective packet-communicating endpoint device and said destination.

11. The arrangement according to claim 1, wherein at least one of the packet-communicating endpoint devices is adapted to select one of the plurality of the other packet-based servers via which to communicate packet-based data as a function at least one of: a pre-assigned priority list, cost, time of day, location of target telephony communication destination, a category of service providers associated with each of the plurality of the other packet-based servers, and a type of media in the packet-based data being communicated.

12. An endpoint telephony device for use in a communications system including an internet-based private branch exchange adapted to communicate packet-based telephony data with a plurality of endpoint telephony devices over communications paths, the endpoint telephony device comprising:
a packet-based communications link adapted to directly couple to a packet-based communications path for communicating with the internet-based private branch exchange, the communications path being coupled to a plurality of packet-based servers including the internet-based private branch exchange;
a telephony processor configured and arranged to auto-discover an internet-based private branch exchange using a query that returns data that includes identifiers for servers of the plurality of packet-based servers and establish communication with the internet-based private branch exchange for establishing packet-based telephony communications with one of the plurality of endpoint telephony devices via the internet-based private branch exchange.

13. The device of claim 12, wherein the telephony processor is further adapted to use a unique address and to communicate the unique address to the internet-based private branch exchange for the establishment of packet-based communications therewith.

14. The device of claim 12, wherein the telephony processor is further adapted to use a stored unique code that identifies the internet-based private branch exchange, relative to the plurality of other packet-based servers, for establishing communications with the internet-based private branch exchange.

15. The device of claim 12, wherein the telephony processor is further adapted to execute a program that causes the packet-communicating endpoint device to search for one of the plurality of packet-based servers that manifests an acceptable routing path to establish packet-based communication with the one of the plurality of packet-communicating endpoint telephony devices.

16. A telephony communications arrangement comprising:
an internet-based private branch exchange including programmable means for controlling a server at the internet-based private branch exchange, the internet-based private branch exchange adapted to communicate to a plurality of remote internet telephones over an internet communications link using packet-based communications, the internet communications link being further coupled to a plurality of other packet-based servers; and
a plurality of packet-communicating internet telephones, each internet telephone comprising:
means for receiving an audible voice signal and for converting the audible voice signal into packet-based voice data for communicating on the internet communications link;
means for receiving packet-based voice data via the internet communications link and for converting the packet-based voice data into an audible signal; and communications means for automatically discovering the internet-based private branch exchange and, in response to the automatic discovery, establishing communications with the internet-based private branch exchange for requesting the establishment of telephone communications between the internet telephone and a recipient telephone; and wherein the server at the internet-based private branch exchange is configured and arranged for facilitating the communication of voice data between one of the internet telephones and a recipient telephone in response to the communications means of the one of the internet telephones requesting the establishment of telephone communications with the recipient telephone.

17. The arrangement of claim 16, wherein the recipient telephone is an internet telephone and wherein the server is adapted for facilitating the communication of voice data between the one of the internet telephones and the recipient internet telephone by facilitating the establishment of a direct connection between the one of the internet telephones and the recipient internet telephone via the internet communications link.

18. The arrangement of claim 16, wherein the recipient telephone is an internet telephone and wherein the server is adapted for facilitating the communication of voice data between one of the internet telephones and the recipient internet telephone by passing voice data between the one of the internet telephones and the recipient internet telephone, via the internet-based private branch exchange and the internet communications link.

19. The arrangement of claim 16, wherein the recipient telephone is a non-internet telephone and wherein the server is adapted for facilitating the communication of voice data between one of the internet telephones and the recipient non-internet telephone by passing voice data to and from the one of the internet telephones to the recipient non-internet telephone, via the internet-based private branch exchange and a non-internet communications link.

20. The arrangement of claim 16, wherein the server at the internet-based private branch exchange is configured and arranged for facilitating the communication of voice data between one of the internet telephones and a recipient telephone in response to the communications means of the one of the internet telephones requesting the establishment of telephone communications with the recipient telephone and as a function of the geographic location of at least one of the internet telephones and the recipient telephone.

* * * * *